United States Patent
Noll et al.

(10) Patent No.: US 9,645,948 B2
(45) Date of Patent: May 9, 2017

(54) ACCESS KEY GENERATION FOR COMPUTER-READABLE MEMORY

(71) Applicant: Hamilton Sundstrand Corporation, Charlotte, NC (US)

(72) Inventors: Christopher Noll, Glastonbury, CT (US); Steven A. Avritch, Bristol, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 106 days.

(21) Appl. No.: 14/598,430

(22) Filed: Jan. 16, 2015

(65) Prior Publication Data
US 2016/0210247 A1    Jul. 21, 2016

(51) Int. Cl.
*G06F 3/00* (2006.01)
*G06F 12/14* (2006.01)
*G06F 21/78* (2013.01)
*G06F 21/62* (2013.01)

(52) U.S. Cl.
CPC ...... *G06F 12/1466* (2013.01); *G06F 21/6218* (2013.01); *G06F 21/78* (2013.01); *G06F 2212/1052* (2013.01)

(58) Field of Classification Search
USPC ............ 726/19; 713/185, 186, 193; 380/281
See application file for complete search history.

(56) References Cited

U.S. PATENT DOCUMENTS

| 4,223,403 | A | * | 9/1980 | Konheim | G06Q 20/3829 340/5.81 |
|---|---|---|---|---|---|
| 6,088,017 | A | * | 7/2000 | Tremblay | G06F 3/011 345/156 |
| 7,128,270 | B2 | * | 10/2006 | Silverbrook | G06F 3/03545 235/462.45 |
| 2001/0052073 | A1 | * | 12/2001 | Kern | G06F 21/10 713/161 |

(Continued)

FOREIGN PATENT DOCUMENTS

EP    2709034 A1    3/2014

OTHER PUBLICATIONS

Extended European Search Report for European Patent Application No. 16151139.9, dated May 17, 2016, 7 pages.

*Primary Examiner* — Joseph P Hirl
*Assistant Examiner* — Sayed Beheshti Shirazi
(74) *Attorney, Agent, or Firm* — Kinney & Lange, P.A.

(57) ABSTRACT

In one example, a method includes receiving, by a controller device from a master device operably connected to the controller device, a memory access request configured to request access to computer-readable memory of the controller device. The method further includes sampling, by the controller device, time-varying data received from a controlled device operably connected to the controller device, and generating, by the controller device in response to receiving the memory access request, an access key using the sampled time-varying data received from the controlled device. The method further includes transmitting, by the controller device, the generated access key to the master (Continued)

device, and enabling, by the controller device, access to the computer-readable memory of the controller device in response to data write commands received from the master device that include an access code based on the access key.

11 Claims, 4 Drawing Sheets

(56) References Cited

U.S. PATENT DOCUMENTS

| | | | | |
|---|---|---|---|---|
| 2004/0096045 A1* | 5/2004 | Suffern | ............... | H04M 1/656 |
| | | | | 379/93.32 |
| 2004/0211268 A1* | 10/2004 | Morelli | ............... | G01L 1/127 |
| | | | | 73/862.69 |
| 2010/0245141 A1* | 9/2010 | Ushie | ............... | H03M 1/1076 |
| | | | | 341/122 |
| 2011/0087858 A1* | 4/2011 | Persson | ............... | G06F 12/1027 |
| | | | | 711/206 |
| 2011/0087897 A1* | 4/2011 | Nelson | ............... | G06F 21/73 |
| | | | | 713/193 |
| 2011/0131264 A1* | 6/2011 | Hars | ............... | G06F 7/588 |
| | | | | 708/254 |
| 2012/0176124 A1* | 7/2012 | Szulyk | ............... | G01B 7/003 |
| | | | | 324/207.18 |
| 2012/0243128 A1* | 9/2012 | Noll | ............... | H05B 33/089 |
| | | | | 361/18 |
| 2012/0253556 A1* | 10/2012 | Noll | ............... | B64C 13/503 |
| | | | | 701/3 |
| 2012/0253564 A1* | 10/2012 | Noll | ............... | G06F 3/1423 |
| | | | | 701/14 |
| 2014/0380060 A1* | 12/2014 | Ganguly | ............... | G06F 21/31 |
| | | | | 713/186 |
| 2015/0156184 A1* | 6/2015 | Tucker | ............... | G06F 21/73 |
| | | | | 713/168 |
| 2015/0278118 A1* | 10/2015 | Lee | ............... | G06F 12/145 |
| | | | | 711/102 |
| 2016/0044506 A1* | 2/2016 | Rajadurai | ............... | H04W 12/04 |
| | | | | 455/410 |
| 2016/0154384 A1* | 6/2016 | Cameron | ............... | G05B 11/01 |
| | | | | 701/3 |

* cited by examiner

ACCESS KEY GENERATION FOR COMPUTER-READABLE MEMORY

BACKGROUND

The present disclosure is related to access of computer-readable memory, and in particular to access keys used for enabling access to the computer-readable memory.

Computerized systems often implement memory protection schemes to prevent processes or devices from accessing one or more portions of computer-readable memory that have not been allocated for use by the process or device. In some instances, at least a portion of the computer-readable memory can be considered a protected resource, meaning that access to the computer-readable memory is controlled by the memory protection scheme. Examples of such protected resources can include source code images, operational and/or configurable parameters, or other data that may be critical for operation of the device.

Certain systems can include multiple computerized devices (e.g., devices including processing circuitry and/or computer-readable memory) that communicate to transmit information between the devices via a communication protocol, such as a command-response protocol. Memory protection schemes implemented by such systems can incorporate access keys (or codes) used to provide authenticity (e.g., identity) and integrity (e.g., intent) checks with respect to access requests to the protected resource. As one example, a memory protection scheme can require that access to a protected resource is preceded by a predetermined key, often represented by a unique sequence of bits known to both the source (e.g., accessing) and target (e.g., accessed) devices. Memory access requests that are not preceded by the predetermined key can be denied, thereby helping to ensure that only authorized devices (i.e., those devices with which the key has been shared) are allowed access to the protected memory. In addition, use of the predetermined key can promote the integrity of the protected resource by helping to minimize unintended memory modifications (i.e., unintended by even an authorized device).

Periodic modification of the predetermined key, such as the use of random and/or pseudo-random keys, can enhance security of the protected memory. However, such schemes typically require implementation of a random (or pseudo-random) number generator for use as an algorithmic seed, thereby increasing the processing burden and complexity of implementation associated with the scheme.

SUMMARY

In one example, a method includes receiving, by a controller device from a master device operably connected to the controller device, a memory access request configured to request access to computer-readable memory of the controller device. The method further includes sampling, by the controller device, time-varying data received from a controlled device operably connected to the controller device, and generating, by the controller device in response to receiving the memory access request, an access key using the sampled time-varying data received from the controlled device. The method further includes transmitting, by the controller device, the generated access key to the master device, and enabling, by the controller device, access to the computer-readable memory of the controller device in response to data write commands received from the master device that include an access code based on the access key.

In another example, a device includes computer-readable memory, first interface circuitry, second interface circuitry, and processing circuitry. The computer-readable memory is configured to store one or more operational parameters associated with operation of the device. The first interface circuitry is configured to operably connect to a master device. The second interface circuitry is configured to operably connect to a controlled device. The processing circuitry is operably connected to the computer-readable memory, the first interface circuitry, and the second interface circuitry. The processing circuitry is configured to receive, via the first interface circuitry, a memory access request configured to request access to the computer-readable memory. The processing circuitry is further configured to sample time-varying data received from the controlled device via the second interface circuitry, and generate an access key using the sampled time-varying data received from the controlled device in response to receiving the memory access request. The processing circuitry is further configured to transmit, via the first interface circuitry, the generated access key to the master device, and enable access to the computer-readable memory in response to data write commands received from the master device via the first interface circuitry that include an access code based on the access key.

DETAILED DESCRIPTION

As described herein, rather than implement a separate process to generate a pseudo-random seed for an access key, a device implementing techniques of this disclosure can generate a pseudo-random access key using sampled time-varying data received by the device. For instance, a controller device (e.g., an actuator controller) configured to control operation of a controlled device (e.g., an actuator) can receive a request to access (e.g., write to) computer-readable memory of the controller from a master device, such as a flight control computer of an aircraft (e.g., a helicopter, an airplane, or other aircraft). In response, the controller can sample time-varying data received by the controller, such as by selecting bits from a bit stream provided by, e.g., an analog-to-digital converter (ADC) of the controller that receives a time-varying signal, such as an alternating current (AC). The controller can generate an access key using the sampled data, such as by determining the key as the sequence of sampled bits. Thereafter, the controller can transmit the access key to the master device. The controller can allow access to the computer-readable memory in response to access requests (e.g., write commands) that include a valid access code based on the access key (e.g., the access key itself or an access code derived from the access key), but deny access to those requests that do not include a valid access code, thereby helping to minimize unauthorized and/or unintended access to the memory space and generally increasing a security level of the memory. In addition, by generating the access key using a time-varying signal already received by the device, rather than implementing a separate process for generating a pseudo-random seed, techniques of this disclosure can increase processing speed and improve efficiency of the device.

Figure 1:
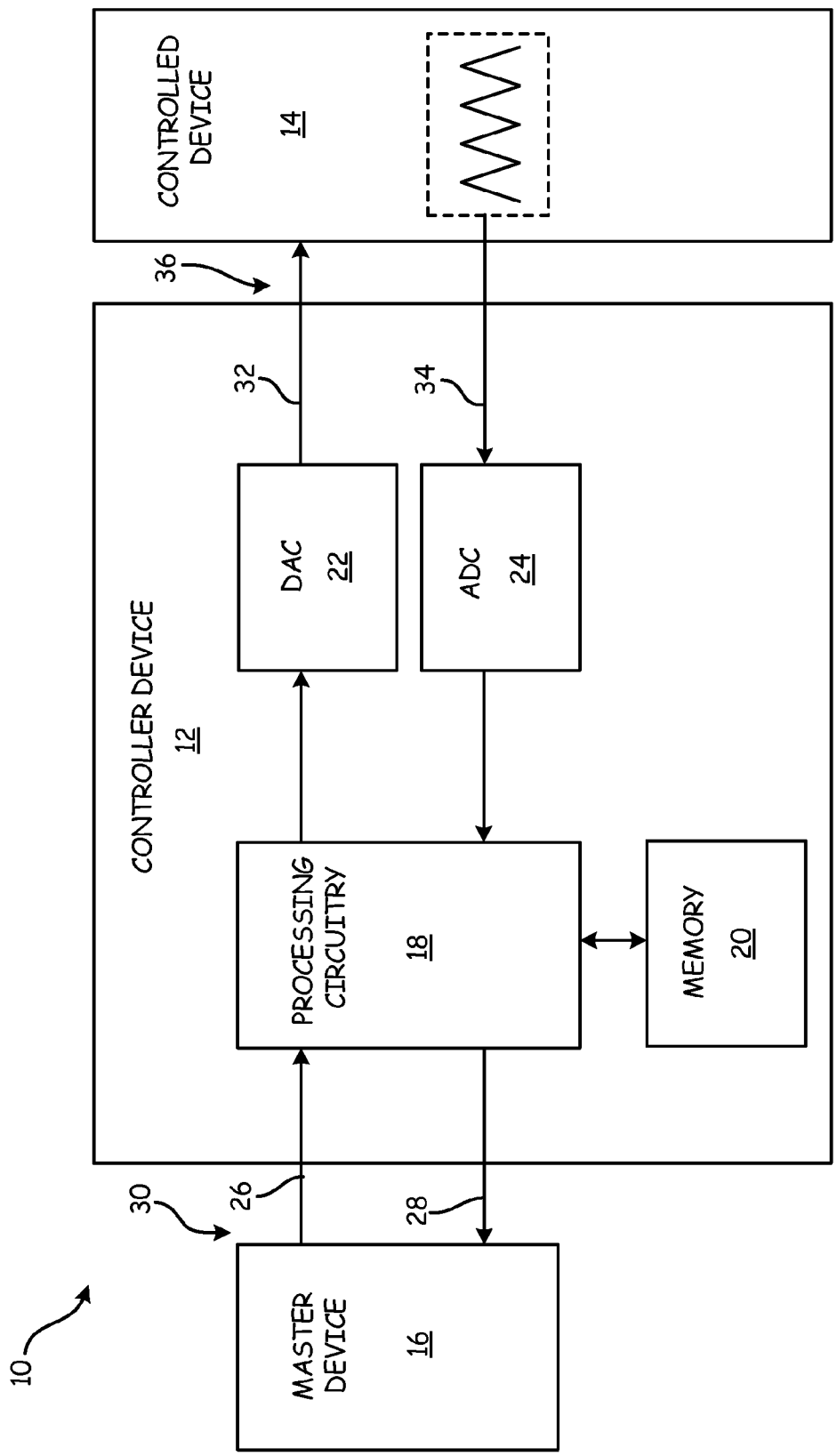
FIG. 1 is a block diagram of a system including a controller device that can generate an access key using sampled time-varying data received from a controlled device.

FIG. 1 is a block diagram of system 10 including controller device 12 that can generate an access key using sampled time-varying data received from controlled device 14. As illustrated in FIG. 1, system 10 can further include master device 16. Controller device 12 can include processing circuitry 18, computer-readable memory 20, digital-to-analog converter (DAC) 22, and analog-to-digital converter (ADC) 24.

Controlled device 14 can be any device configured to receive operational commands from, e.g., a controller device such as controller device 12, and to operate in accordance with the received operational commands. As one example, controlled device 14 can be and/or include one or more sensors, such as pressure sensors, position sensors, temperature sensors, accelerometers, gyroscopes, or other sensors. As another example, controlled device 14 can be and/or include one or more motors and/or actuators that induce movement of, e.g., a connected part or mechanism of a moving system. For instance, controlled device 14 can be an actuator connected to (e.g., mechanically connected, hydraulically connected, pneumatically connected, or otherwise connected) and configured to cause movement of a flight control surface of an aircraft, such as an aileron, elevator, flap, slat, helicopter rotor, or other flight control surface. In some examples, controlled device 14 can include one or more sensors configured to sense system parameters and one or more motors and/or actuators configured to cause movement within the system.

Controller device 12 can be any device configured to control and/or monitor operation of controlled device 14. For instance, controller device 12 can be configured to transmit operational commands (e.g., movement commands) to controlled device 14 to control operation of controlled device 14. Controller device 12 can monitor operation of controlled device 14, such as by monitoring one or more feedback signals indicative of the operational status (e.g., error status) of controlled device 14 and/or the operational state (e.g., position, movement rate, or other operational state) of controlled device 14. As an example, such as when controlled device 14 is an actuator device, controller device 12 can be an actuator controller configured to transmit position commands (e.g., linear position commands, angular position commands, or other position commands) and/or movement commands (e.g., movement rate commands, movement direction commands, or other movement commands) to controlled device 14 to command movement of the actuator.

Master device 16 can be any device configured to interface with controller device 12 to transmit and receive data, such as messages, operational parameters and/or commands, or other data with controller device 12. For instance, master device 16 can be a hardware device having interface and/or control circuitry configured to interface with controller device 12 and implement one or more control algorithms configured to cause controller device 12 to control operation of controlled device 14.

As illustrated in FIG. 1, controller device 12 can include processing circuitry 18, computer-readable memory 20, DAC 22, and ADC 24. Examples of processing circuitry 18 can include any one or more of a microprocessor, a digital signal processor (DSP), an application specific integrated circuitry (ASIC), a field-programmable gate array (FPGA), or other equivalent discrete or integrated logic circuitry.

Computer-readable memory 20 can be configured to store information within controller device 12 during operation. Computer-readable memory 20, in some examples, is described as a computer-readable storage medium. In some examples, a computer-readable storage medium can include a non-transitory medium. The term "non-transitory" can indicate that the storage medium is not embodied in a carrier wave or a propagated signal. In certain instances, a non-transitory storage medium can store data that can, over time, change (e.g., in RAM or cache). In some examples, computer-readable memory 20 is a temporary memory, meaning that a primary purpose of the computer-readable memory is not long-term storage. Computer-readable memory 20 can, in some cases, be described as a volatile memory, meaning that the computer-readable memory does not maintain stored contents when power to controller device 12 is removed. Examples of volatile memories can include random access memories (RAM), dynamic random access memories (DRAM), static random access memories (SRAM), and other forms of volatile memories. Computer-readable memory 20 can be used to store program instructions for execution by processing circuitry 18. Computer-readable memory 20, in one example, is used by software or applications running on controller device 12 to temporarily store information during program execution.

Computer-readable memory 20, in some examples, also includes one or more computer-readable storage media. Computer-readable memory 20 can be configured to store larger amounts of information than volatile memory. Computer-readable memory 20 can further be configured for long-term storage of information. In some examples, computer-readable memory 20 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

DAC 22 can be, e.g., an integrated circuit (IC) configured to convert a digital signal (e.g., a binary signal) to a corresponding analog signal, such as a current or voltage signal. As illustrated, DAC 22 can receive a digital signal (e.g., a bit stream) from processing circuitry 18 and can output the corresponding analog signal to controlled device 14. As one example, processing circuitry 18 can determine a digital signal corresponding to an alternating current which can be converted by DAC 22 to the corresponding analog alternating current signal. Controlled device 14 can receive and use the analog signal for operation of controlled device 14, such as to drive movement of an actuator or motor.

ADC 24 can be, for example, an IC configured to convert an analog signal (e.g., a current or voltage signal) to a corresponding digital (e.g., binary) signal. ADC 24 can receive a time-varying signal, such as the cyclically time-varying signal (e.g., an AC current) illustrated in FIG. 1. ADC 24 can operate at a clock frequency, such as four kilo Hertz (kHz), eight kHz, or other frequencies, and can convert the received analog signal to a digital signal by sampling the signal at the clock frequency and outputting a digital representation (e.g., binary representation) of the amplitude of the sampled signal. A resolution of the output digital representation of the amplitude can be determined by a number of bits included in the output. As the number of bits increases, the corresponding resolution of the output increases. As the number of bits decreases, the corresponding resolution of the output decreases. For example, a twelve bit output can provide a higher resolution (i.e., a closer approximation of the analog signal) than an eight bit output. A resolution of ADC 24 can be pre-determined based on, e.g., a frequency of an input analog signal, a threshold resolution required for operational use by processing circuitry 18, or other factors.

As illustrated in FIG. 1, controller device 12 can operably connect with master device 16 to send and receive data via communication pathways 26 and 28. Communication pathways 26 and 28 can be embodied in one or more electrical connections (e.g., wiring and pin connections) and/or one or more communicative topologies (e.g., network connections, such as a serial data bus, Ethernet, or other communicative connections). As such, communication pathways 26 and 28 can be described, in certain examples, as interface circuitry 30.

Controller device 12 is further configured to operably connect with controlled device 14 via connections 32 and 34. Connections 32 and 34 can be, for instance, electrical connections (e.g., electrical wiring or pin connections) that enable communicative and/or operative connection between controller device 12 and controlled device 14. Accordingly, connections 32 and 34 can be described, in some examples, as interface circuitry 36. While illustrated in FIG. 1 as including two connections 32 and 34 for ease of illustration and purposes of discussion, interface circuitry 36 can include more than two connections, such as tens or hundreds of such connections.

In one example operation of system 10, master device 16 can be a flight control computer (FCC) of an aircraft, controlled device 14 can be an actuator configured to control movement of a flight control surface of the aircraft, and controller 12 can be an actuator controller. In such an example, master device 16 can be configured to manage operation of flight control surfaces (e.g., via controller device 12 and controlled device 14) to provide controlled flight of the aircraft. For instance, master device 16 can receive inputs corresponding to aircraft operational parameters from one or more sensor systems of the aircraft (not illustrated), such as airspeed, elevation, vertical speed, heading, pitch, roll, yaw, or other operational parameters. Master device 16 can convert a commanded parameter, such as pitch, to a corresponding flight control surface position. Master device 16 can transmit the determined flight control surface position to controller device 12 (e.g., via interface circuitry 30). In response, controller device 12 can provide operational commands to controlled device 14 (e.g., via interface circuitry 36) to cause controlled device 14 to move the flight control surface to the commanded position. In this way, master device 16 can implement an outer loop of a control algorithm that translates commanded flight parameters to corresponding control surface movements calculated to achieve the commanded flight parameter, and controller device 12 can implement an inner loop of the control algorithm that accomplishes the commanded control surface movements.

Controller device 12 can store one or more operational parameters in computer-readable memory 20 usable by controller device 12 for operational control of controlled device 14, such as gains, coefficients, or other operational parameters. Such operational parameters can be considered, in certain examples, as a protected resource of controller device 12. Master device 16 can transmit a memory access request, such as a reprogramming request, to request access to computer-readable memory 20 to reprogram (i.e., write new data) to computer-readable memory 20. Such reprogramming can be useful, e.g., to update operational performance of controller device 12, such as to accommodate algorithmic and/or physical parameter changes within the system.

In response to receiving the memory access request, controller device 12 can sample time-varying data received from controlled device 14 for use in generating an access key usable to control access to computer-readable memory 20. For instance, controller device 12 can select one or more bits from the digital bit stream provided by ADC 24 after conversion of a time-varying analog signal received from controlled device 14, as is further described below. Controller device 12 can generate the access key (e.g., a sequence of the selected bits), and can transmit the generated access key to master device 16 via interface circuitry 30.

Master device 16 can access computer-readable memory 20 (e.g., modify operational parameters included in computer-readable memory 20) by including an access code based on the access key in subsequent data write command messages. As one example, the access code can be the access key, i.e., a code that matches the access key. As another example, the access code can be derived from the access key. For instance, master device 16 can derive the access code using a public key (e.g., an integer, a sequence of bits, or other public key known by both master device 16 and controller device 12) and the access key. Controller device 12 can enable access to computer-readable memory 20 in response to data write commands that include an access code based on the generated access key, and can deny access in response to data write commands that do not include an access code based on the access key.

In this way, controller device 12 can control access to computer-readable memory 20 by generating an access key based on time-varying data already received and usable by controller device 12 for operational control of controlled device 14. By sampling time-varying data (as opposed to time invariant data), controller device 12 helps to ensure that each generated key will be pseudo-random in nature, thereby helping to minimize a chance of inadvertent data access. Moreover, techniques of this disclosure can increase the speed and efficiency of processing circuitry 18 by sampling time-varying data already received and usable by controller device 12 rather than implement a separate process executable by processing circuitry 18 to generate a random or pseudo-random seed for generation of the access key.

Figure 2:
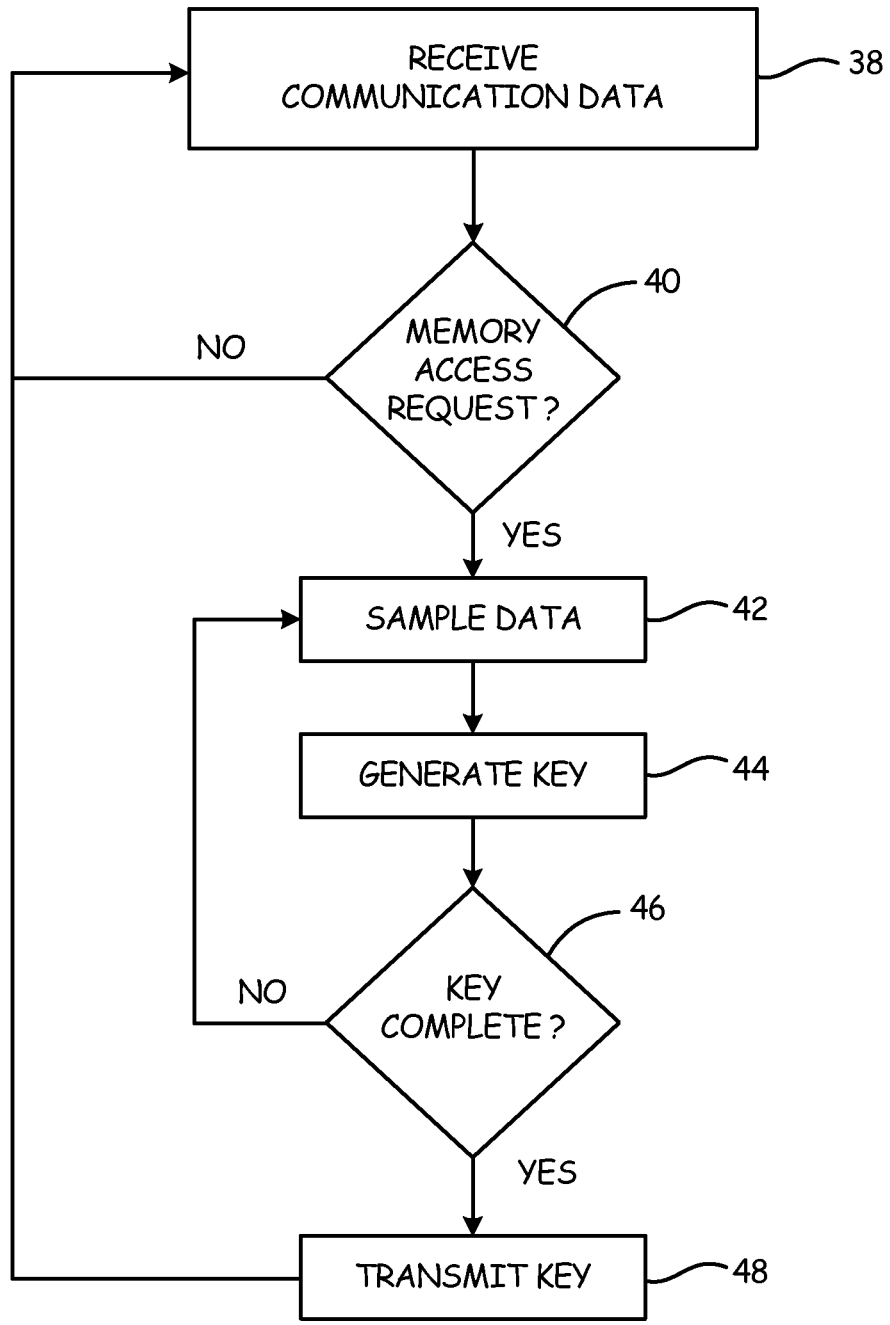
FIG. 2 is a flow diagram illustrating example operations for generating an access key using sampled time-varying data received from a controlled device.

FIG. 2 is a flow diagram illustrating example operations for generating an access key using sampled time-varying data received from a controlled device. For purposes of illustration and discussion, the example operations are described below within the context of system 10 including controller device 12, controlled device 14, and master device 16, as shown in FIG. 1.

Controller device 12 can receive communication data from master device 16 (38). For example, controller device 12 can receive one or more communication messages from master device 16 via interface circuitry 30. Controller device 12 can determine whether the communication data includes a memory access request (40). For instance, processing circuitry 12 can determine whether the communication message requests access to computer-readable memory 20, such as to modify a protected resource of computer-readable memory 20. The protected resource can include operational parameters usable by controller device 12 for operational control of controlled device 12, such as gains, coefficients, or other operational parameters. In some examples, the protected resource can include source code (i.e., computer-readable instructions) which, when executed by processing circuitry 18, cause processing circuitry 18 to operate in accordance to techniques disclosed herein. In other examples, the protected resource can include operational instructions, such as very high speed integrated circuitry hardware description language (VHDL) instructions that identify logical operations performed by processing circuitry 18.

In examples where processing circuitry 18 determines that the communication data does not include a memory access request ("NO" branch of 40), processing circuitry can continue to receive communication data from master device 16 (38). In certain examples, processing circuitry 18 can perform other processing tasks, such as to control operation of controlled device 14 based on the received communication data. For instance, the communication data can include a command to cause controlled device 14 (e.g., an actuator) to move to a commanded position. Accordingly, processing circuitry 18 can operate to cause controlled device 14 to move to the commanded position.

In examples where processing circuitry 18 determines that the communication data includes a memory access request ("YES" branch of 40), processing circuitry 18 can sample time-varying data received as input by controller device 12 (42). For example, controller device 12 can sample time-varying data received by controller device 12 from controlled device 14. The time-varying data can be any data received by controller device 12 that varies with respect to time. As one example, the time-varying data can be data representative of an AC current received from controlled device 14, such as an AC current received by ADC 24 of controller device 12. In such an example, processing circuitry 18 can retrieve one or more bits from ADC 24 corresponding to the digitally-converted analog AC current signal converted by ADC 24. Processing circuitry 18, in one example, can retrieve the bits converted by ADC 24 during a single clock cycle of ADC 24. In other examples, processing circuitry 18 can select bits converted by ADC 24 during multiple clock cycles of ADC 24. In one example operation, processing circuitry 18 can transmit an AC excitation signal to controlled device 14 (e.g., via DAC 22 and interface circuitry 36), and can receive the AC excitation signal from controlled device 14 (e.g., as an electrical wrap circuit) via interface circuitry 36 and ADC 24. Such an excitation signal can be used by processing circuitry 18 to monitor the operational state (e.g., health) of controlled device 14, and can also provide a time-varying signal that can be sampled for generation of the a pseudo-random access key.

Processing circuitry 18 can generate, in response to receiving the memory access request, an access key using the sampled time-varying data (44). For instance, processing circuitry 18 can determine the access key as the sequence of bits retrieved from ADC 24. Processing circuitry 18 can determine whether generation of the access key is complete (46). In examples where processing circuitry 18 determines that generation of the access key is not complete ("NO" branch of 46), processing circuitry 18 can continue to sample time-varying data (44). For instance, processing circuitry 18 can retrieve data from multiple clock cycles of ADC 24, such as in examples where processing circuitry 18 generates an access key having a greater number of bits than a resolution of a single data sample retrieved from ADC 24. Processing circuitry 18 can continue to sample the time-varying data until a threshold number of bits of the sampled time-varying have been selected for generation of the access key, such as six bits, eight bits, twelve bits, or other numbers of bits. In general, processing circuitry 18 can generate the access key using a threshold number of bits determined to provide sufficient security to prevent unauthorized and/or unintentional modification of the data stored at computer-readable memory 20.

In examples where processing circuitry 18 determines that generation of the access key is complete ("YES" branch of 46), processing circuitry 18 can transmit the generated access key to master device 16 (48). For example, processing circuitry 18 can transmit the generated access key to master device 16 via interface circuitry 30 that operably connects master device 16 and controller device 12.

Figure 3:
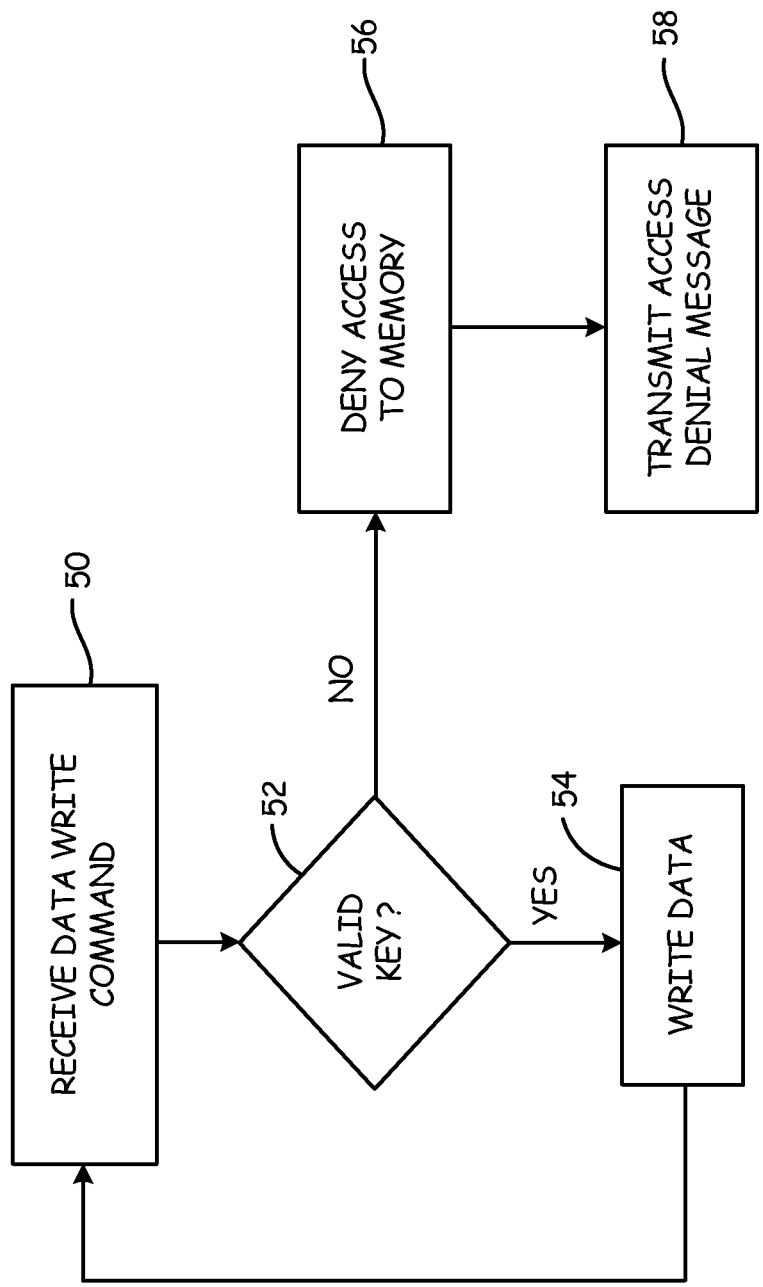
FIG. 3 is a flow diagram illustrating example operations for enabling access to computer-readable memory based on a determination of whether a data access command includes an access code based on an access key.

FIG. 3 is a flow diagram illustrating example operations for enabling access to computer-readable memory based on a determination of whether a data access command includes an access code based on an access key. For purposes of illustration and discussion, the example operations are described below within the context of system 10 including controller device 12, controlled device 14, and master device 16, as shown in FIG. 1.

Controller device 12 can receive a data write command (50) configured to modify data stored at computer-readable memory 20. For example, controller device 12 can receive a communication message from master device 16 via interface circuitry 30, the communication message configured to cause processing circuitry 18 to modify data (e.g., protected data, such as operational parameters and/or operating instructions) stored at computer-readable memory 20.

Controller device 12 can determine whether the data write command includes a valid access code (52). For instance, processing circuitry 18 of controller device 12 can determine that the data write command includes a valid access code in response to determining that an access code included in the data write command is based on an access key generated by controller device 12. As one example, the access code can be (e.g., match) an access key generated by controller device 12. As another example, the access code can be different than, but derived from an access key generated by controller device 12. For instance, master device 16 can use a public key encryption algorithm to derive an access code from both an access key received from controller device 12 and a public key (e.g., an integer value, a sequence of bits, or other numerical representation) known to both controller device 12 and master device 16. Controller device 12 can determine that the received data write command includes a valid access code using the public key, such as by reversing the public key encryption algorithm to decode the received access code and determining whether the decoded value matches the access key. As an example, master device 16 can multiply the access code by the public key to derive the access code from the access key. In such an example, controller device 12 can divide the received access code by the public key and determine whether the resulting value matches the access key. As another example, master device 16 can shift the bits of the access key by an amount and direction specified by the public key. In such an example, controller device 12 can shift the bits of the received access code by the amount and in an opposite direction specified by the public key to determine whether the resulting value matches the access key. In general, master device 16 can derive the access code using any invertible algorithm capable of deriving a unique access code from each given access key. Controller device 12 can determine that the access code is based on the access key by inverting the algorithm and comparing the result to the access key.

In some examples, controller device 12 can determine that the data write command includes a valid access code in response to determining that an access code included in the data write command is both based on an access key generated by controller device 12 and is received within a threshold amount of time from a time when the access key is generated, such as ten milliseconds, twenty milliseconds, or other threshold amounts of time. In this way, controller device 12 can determine that a received access code is not based on a "stale" access key, in that it is based on a currently-valid key having less than a threshold age.

In examples where controller device 12 determines that the data write command is based on a valid access key ("YES" branch of 52), controller device 12 can store the data included in the data write command in computer-readable memory 20 (54). For instance, processing circuitry 18 can cause computer-readable memory 20 to store, modify, or delete data stored in computer-readable memory 20 (i.e., enable access to the computer-readable memory), such as operational parameter data and/or operational instruction data. Controller device 12 can continue to receive data write commands from master device 16 (50).

In examples where controller device 12 determines that the data write command is not based on a valid access key ("NO" branch of 52), controller device 12 can deny access to computer-readable memory 20 (56). For instance, processing circuitry 18 can refrain from causing computer-readable memory 20 to store, modify, or delete the data included in the data write command. Controller device 12 can transmit an access denial message in response to determining that the received data write command is not based on a valid access key (58). In some examples, controller device 12 can abort a data reprogramming operational mode in response to receiving the data write command that is not based on the valid access key. For instance, processing circuitry 18 of controller device 12 can initiate a data reprogramming operational mode of the controller device 12, the data reprogramming operational mode configured to enable access to computer-readable memory 20. In response to receiving the data write command that is not based on the valid access key, processing circuitry 18 can abort the data reprogramming operational mode, thereby denying future access to computer-readable memory 20 (e.g., modifications of data stored in computer-readable memory 20) until a subsequent data access request is received.

Figure 4:
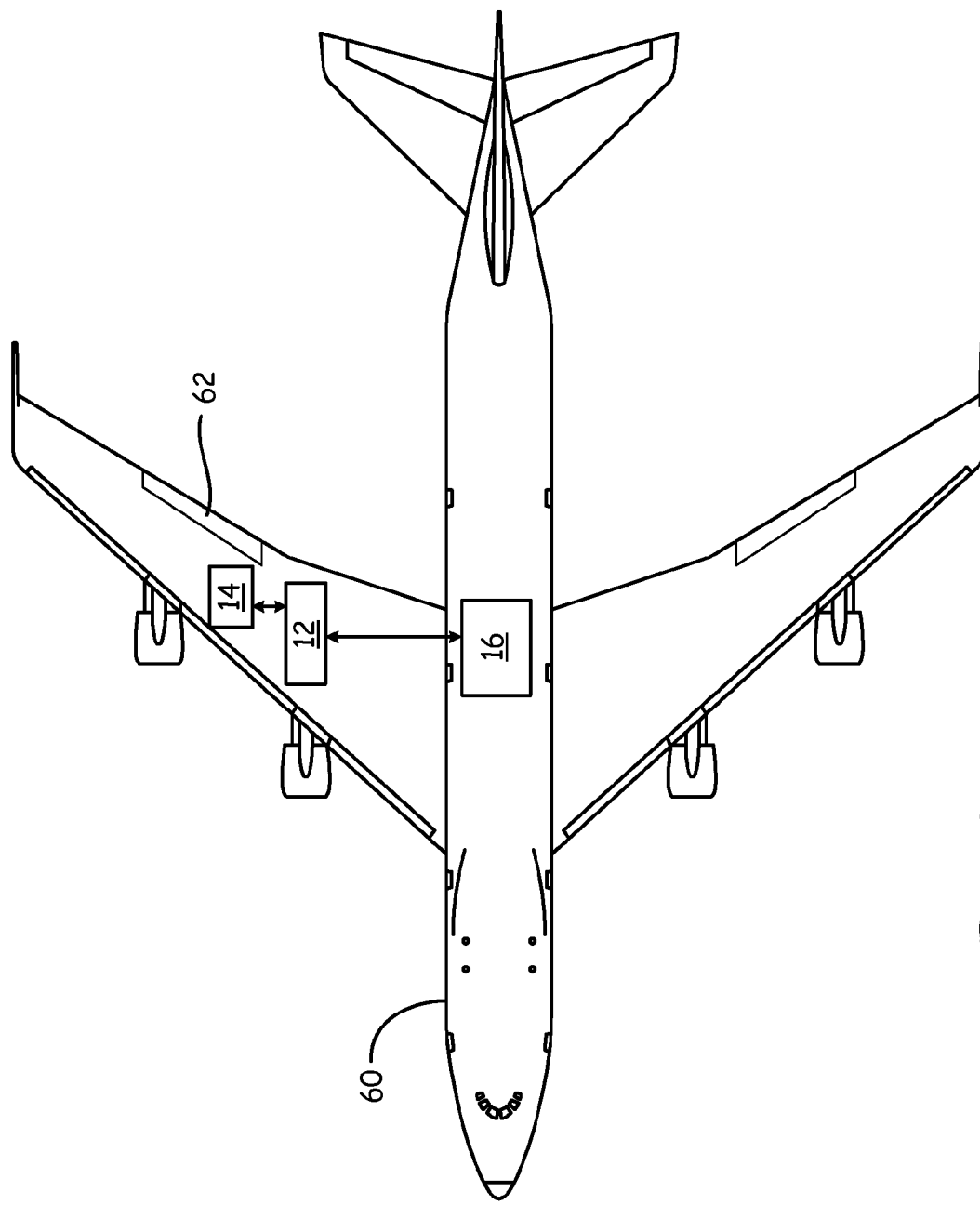
FIG. 4 is a schematic block diagram of an aircraft including a controller device that can generate an access key using sampled time-varying data received from an actuator device.

FIG. 4 is a schematic block diagram of aircraft 60 including controller device 12 that can generate an access key using sampled time-varying data received from controlled device 14. In the example of FIG. 4, controlled device 14 is an actuator device operably connected to and configured to control movement of aileron 62 (i.e., a flight control surface) of aircraft 60. Master device 16, in this example, is a flight control computer (FCC) configured to manage operation of flight control surfaces (including aileron 62) to provide controlled flight of aircraft 60. While illustrated in FIG. 4 as a commercial jet aircraft, in other examples, aircraft 60 can be a helicopter, a drone (e.g., fixed-wing or rotary-wing unmanned aerial vehicle), or other type of aircraft. In the example of FIG. 4, master device 16 (i.e., a FCC in this example) can convert a commanded parameter, such as aircraft roll, to a corresponding position of aileron 62. Master device 16 can transmit the commanded position to controller device 12, which can provide operational commands to controlled device 14 (i.e., an actuator in this example) to cause controlled device 14 to move aileron 62 to the commanded position. Controller device 12 can implement one or more control algorithms, based at least in part on operational parameters stored in computer-readable memory (e.g., computer-readable memory 20) of controller device 12, to achieve the commanded movement of aileron 62. For instance, the operational parameters can include gains, coefficients, or other parameters usable by controller device 12 during implementation of the control algorithm.

Master device 16, in some examples, can transmit a memory access request to request access to computer-readable memory of controller device 12, such as to modify (e.g., update) the operational parameters usable by controller device 12 during execution of the control algorithm. In response to receiving the data access request, controller device 12 can initiate a data reprogramming operational mode configured to enable access to the computer-readable memory. Controller device 12 can sample time-varying data received from controlled device 14, and can generate a first access key using the sampled time-varying data. Controller device 12 can transmit the first access key to master device 16. Master device 16 can transmit a data write command to modify the data stored at the computer-readable memory of controller device 12, and can include an access code based on the first access key with the data write command (e.g., within a threshold amount of time from receiving the access key, such as twenty milliseconds). Controller device 12 can receive the data write command, and can determine that the data write command is based on the first access key and is received within the threshold amount of time. In response, controller device 12 can modify the data in the computer-readable memory according to the data write command. Master device 16 can continue to transmit data write commands (e.g., each within the threshold amount of time from transmission of a previous data write command) to cause controller device 12 to modify the data stored at the computer-readable memory.

In some examples, controller device 12 can determine that a data write command including an access code based on the first access key has not been received for the threshold amount of time or that an invalid access code (i.e., an access code that is different from and not derived from the first access key) has been received. In response, controller device 12 can abort the data reprogramming operational mode, thereby denying access to computer-readable memory of controller device 12 until controller device 12 receives a subsequent data access request. In such examples, master device 16 can transmit a subsequent data access request to controller device 12. In response, controller device 12 can sample time-varying data received from controlled device 14, and can generate a second access key using the sampled time-varying data, the second access key different than the first access key. Controller device 12 can transmit the second access key to master device 16. Master device 16 can include an access code based on the second access key with subsequent data write commands.

Accordingly, techniques of this disclosure can enable a controller device to sample time-varying data received by the controller device from, e.g., a controlled device. The controller device can generate an access key using the time-varying data. The time-varying nature of the sampled data can provide a pseudo-random source for the access key, thereby helping to ensure that each access key is sufficiently different. By sampling data already received by the controller device and usable by the controller device during operation (e.g., for control of the controlled device), rather than implementing a separate process to generate a pseudo-random seed, techniques described herein can increase processing speed and improved efficiency of the controller device.

Discussion of Possible Embodiments

The following are non-exclusive descriptions of possible embodiments of the present invention.

A method includes receiving, by a controller device from a master device operably connected to the controller device, a memory access request configured to request access to computer-readable memory of the controller device. The method further includes sampling, by the controller device, time-varying data received from a controlled device operably connected to the controller device, and generating, by the controller device in response to receiving the memory access request, an access key using the sampled time-varying data received from the controlled device. The method further includes transmitting, by the controller device, the generated access key to the master device, and enabling, by the controller device, access to the computer-readable memory of the controller device in response to data write commands received from the master device that include an access code based on the access key.

The method of the preceding paragraph can optionally include, additionally and/or alternatively, any one or more of the following features, configurations, operations, and/or additional components:

The access code can be the access key.

The access code can be derived from the access key.

Receiving the memory access request from the master device can include receiving a reprogram request configured to enable the master device to reprogram operational parameters included in the computer-readable memory of the controller device, the operational parameters usable by the controller device for control of the controlled device.

Sampling the time-varying data received from the controlled device can include retrieving, from an analog-to-digital converter of the controller device, a digital representation of at least a portion of an analog signal received from the controlled device.

Retrieving the digital representation of at least the portion of the analog signal received from the controlled device can include retrieving the digital representation of the analog signal received from the controlled device during a single clock cycle of the analog-to-digital converter.

The method can further include transmitting, by the controller device to the controlled device, an alternating current excitation signal. The time-varying data received from the controlled device can include the alternating current excitation signal transmitted from the controlled device to the controller device.

Generating the access key using the sampled time-varying data can include generating the access key as a threshold number of bits of the sampled time-varying data.

Enabling access to the computer-readable memory of the controller device in response to data write commands received from the master device that include the access code based on the access key can include identifying, by the controller device, that a data write command received from the master device includes the access code based on the access key, and storing data included in the data write command in the computer-readable memory in response to determining that the data write command includes the access code based on the access key.

The method can further include initiating, by the controller device, a data reprogramming operational mode of the controller device, the data reprogramming operational mode configured to enable access to the computer-readable memory, and aborting, by the controller device, the data reprogramming operational mode in response to receiving, from the master device, a data write command that does not include the access code based on the access key.

The method can further include using, by the controller device, the time-varying data received from the controlled device in a control algorithm that controls operation of the controlled device.

A device can include computer-readable memory, first interface circuitry, second interface circuitry, and processing circuitry. The computer-readable memory is configured to store one or more operational parameters associated with operation of the device. The first interface circuitry is configured to operably connect to a master device. The second interface circuitry is configured to operably connect to a controlled device. The processing circuitry is operably connected to the computer-readable memory, the first interface circuitry, and the second interface circuitry. The processing circuitry is configured to receive, via the first interface circuitry, a memory access request configured to request access to the computer-readable memory. The processing circuitry is further configured to sample time-varying data received from the controlled device via the second interface circuitry, and generate an access key using the sampled time-varying data received from the controlled device in response to receiving the memory access request. The processing circuitry is further configured to transmit, via the first interface circuitry, the generated access key to the master device, and enable access to the computer-readable memory in response to data write commands received from the master device via the first interface circuitry that include an access code based on the access key.

The device of the preceding paragraph can optionally include, additionally and/or alternatively, any one or more of the following features, configurations, and/or additional components:

The device can further include an analog-to-digital converter operably connected to the processing circuitry and to the controlled device via the second interface circuitry. The analog-to-digital converter can be configured to receive an analog signal from the controlled device, convert the analog signal to a digital signal representative of the received analog signal, and transmit the digital signal to the processing circuitry. The processing circuitry can be configured to sample the time-varying data received from the controlled device by retrieving at least a portion of the digital signal received from the analog-to-digital converter.

The access code can be the access key.

The access code can be derived from the access key.

The processing circuitry can be configured to retrieve at least the portion of the digital signal received from the analog-to-digital converter by being configured to retrieve a portion of the digital signal converted by the analog-to-digital converter during a signal clock cycle of the analog-to-digital converter.

The processing circuitry can be further configured to transmit an alternating current excitation signal to the controlled device. The time-varying data received from the controlled device via the second interface circuitry can include the alternating current excitation signal transmitted from the controlled device.

The processing circuitry can be configured to generate the access key as a threshold number of bits of the sampled time-varying data.

The processing circuitry can be configured to enable access to the computer-readable memory in response to data write commands received from the master device via the first interface circuitry that include the access code based on the access key by at least being configured to identify that a data write command received from the master device via the first interface circuitry includes the access code based on the access key, and store data included in the data write command in the computer-readable memory in response to determining that the data write command includes the access code based on the access key.

The interface circuitry can be further configured to initiate a data reprogramming operational mode of the device, the data reprogramming operational mode configured to enable access to the computer-readable memory, and abort the data reprogramming operational mode in response to receiving, from the master device via the first interface circuitry, a data write command that does not include the access code based on the access key.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
   receiving, by an actuator controller device of an aircraft from a flight control computer of the aircraft that is operably connected to the actuator controller device, a memory access request configured to request access to computer-readable memory of the actuator controller device;
   transmitting, by the actuator controller device to an actuator of the aircraft that is operably connected to the actuator controller device, an alternating current excitation signal;
   receiving back, by the actuator controller device, the alternating current excitation signal from the actuator;
   sampling, by the actuator controller device, the alternating current excitation signal received back from the actuator;
   generating, by the actuator controller device in response to receiving the memory access request from the flight control computer, an access key using the sampled alternating current excitation signal received back from the actuator;
   transmitting, by the actuator controller device, the generated access key to the flight control computer;
   initiating, by the actuator controller device, a data reprogramming operational mode of the actuator controller device, the data reprogramming operational mode configured to enable access to the computer-readable memory;
   enabling, by the actuator controller device, access to the computer-readable memory of the actuator controller device in response to data write commands received from the flight control computer that include an access code based on the access key; and
   aborting, by the actuator controller device, the data reprogramming operational mode in response to receiving, from the flight control computer, a data write command that does not include the access code based on the access key.

2. The method of claim 1, wherein the access code is the access key.

3. The method of claim 1, wherein the access code is derived from the access key.

4. The method of claim 1, wherein sampling the alternating current excitation signal received back from the actuator comprises retrieving, from an analog-to-digital converter of the actuator controller device, a digital representation of at least a portion of the alternating current excitation signal received back from the actuator.

5. The method of claim 4, wherein retrieving the digital representation of at least the portion of the alternating current excitation signal received back from the actuator comprises retrieving the digital representation of the alternating current excitation signal received back from the actuator during a single clock cycle of the analog-to-digital converter.

6. The method of claim 1, wherein enabling access to the computer-readable memory of the actuator controller device in response to data write commands received from the flight control computer that include the access code based on the access key comprises:
   identifying, by the actuator controller device, that a data write command received from the flight control computer includes the access code; and
   storing, by the actuator controller device, data included in the data write command in the computer-readable memory in response to determining that the data write command includes the access code.

7. The method of claim 1, further comprising:
   using, by the actuator controller device, the alternating current excitation signal received back from the actuator in a control algorithm that controls operation of the actuator.

8. An actuator controller device of an aircraft, the actuator controller device comprising:
   non-transitory computer-readable memory configured to store one or more operational parameters associated with operation of the actuator controller device;
   first interface circuitry configured to operably connect to a flight control computer of the aircraft;
   second interface circuitry configured to operably connect to an actuator of the aircraft; and
   processing circuitry operably connected to the computer-readable memory, the first interface circuitry, and the second interface circuitry, the processing circuitry configured to:
      receive, via the first interface circuitry, a memory access request configured to request access to the computer-readable memory;
      transmit an alternating current excitation signal to the actuator via the second interface circuitry;
      receive back the alternating current excitation signal from the actuator via the second interface circuitry;
      sample the alternating current excitation signal received back from the actuator via the second interface circuitry;
      generate an access key using the sampled alternating current excitation signal received back from the actuator in response to receiving the memory access request;
      transmit, via the first interface circuitry, the generated access key to the flight control computer;

initiate a data reprogramming operational mode of the actuator controller device, the data reprogramming operational mode configured to enable access to the computer-readable memory;

enable access to the computer-readable memory in response to data write commands received from the flight control computer via the first interface circuitry that include an access code based on the access key; and abort the data reprogramming operational mode in response to receiving a data write command that does not include the access code based on the access key.

9. The actuator controller device of claim 8, further comprising:

an analog-to-digital converter operably connected to the processing circuitry and to the actuator via the second interface circuitry, the analog-to-digital converter configured to:

receive back the alternating current excitation signal from the actuator;

convert the alternating current excitation signal received back from the actuator to a digital signal representative of the alternating current excitation signal; and transmit the digital signal to the processing circuitry;

wherein the processing circuitry is configured to sample the alternating current excitation signal received back from the actuator by retrieving at least a portion of the digital signal received from the analog-to-digital converter.

10. The actuator controller device of claim 8, wherein the access code is the access key.

11. The actuator controller device of claim 8, wherein the processing circuitry is configured to enable access to the computer-readable memory in response to data write commands received from the flight control computer via the first interface circuitry that include the access code based on the access key by at least being configured to:

identify that a data write command received from the flight control computer via the first interface circuitry includes the access code; and store data included in the data write command in the computer-readable memory in response to determining that the data write command includes the access code.

* * * * *